United States Patent [19]

MacRae

[11] 3,993,473

[45] Nov. 23, 1976

[54] METHOD OF REDUCING IRON OXIDE

[75] Inventor: Donald R. MacRae, Bethlehem, Pa.

[73] Assignee: Bethlehem Steel Corporation, Bethlehem, Pa.

[22] Filed: Mar. 20, 1975

[21] Appl. No.: 560,269

[52] U.S. Cl. .................................. 75/11; 75/26
[51] Int. Cl.² .................... C21C 5/52; C22B 1/10
[58] Field of Search .............................. 75/11, 26

[56] References Cited
UNITED STATES PATENTS

| | | | |
|---|---|---|---|
| 2,805,930 | 9/1957 | Udy | 75/11 |
| 2,894,831 | 7/1959 | Old | 75/9 |
| 3,140,168 | 7/1964 | Halley | 75/26 |
| 3,163,520 | 12/1964 | Collin | 75/11 |
| 3,163,521 | 12/1964 | Rinesch | 75/11 |
| 3,475,160 | 10/1969 | Heinzelmann | 75/26 |
| 3,761,244 | 9/1973 | Hoffert | 75/26 |
| 3,770,421 | 11/1973 | Celada | 75/26 |

*Primary Examiner*—Peter D. Rosenberg
*Attorney, Agent, or Firm*—Joseph J. O'Keefe; John I. Iverson; Robert M. Jones

[57] ABSTRACT

Iron ore particles are partially reduced by passing through a rotary kiln countercurrent to flowing hydrogen and carbon monoxide. The partially reduced ore is then fed into a plasma arc torch wherein the reduction is completed. The off-gas from the arc torch is reacted with methane to reform the water vapor in the off-gas into hydrogen and carbon monoxide which are used to partially reduce the iron ore particles in the rotary kiln.

6 Claims, 1 Drawing Figure

U.S. Patent  Nov. 23, 1976  3,993,473
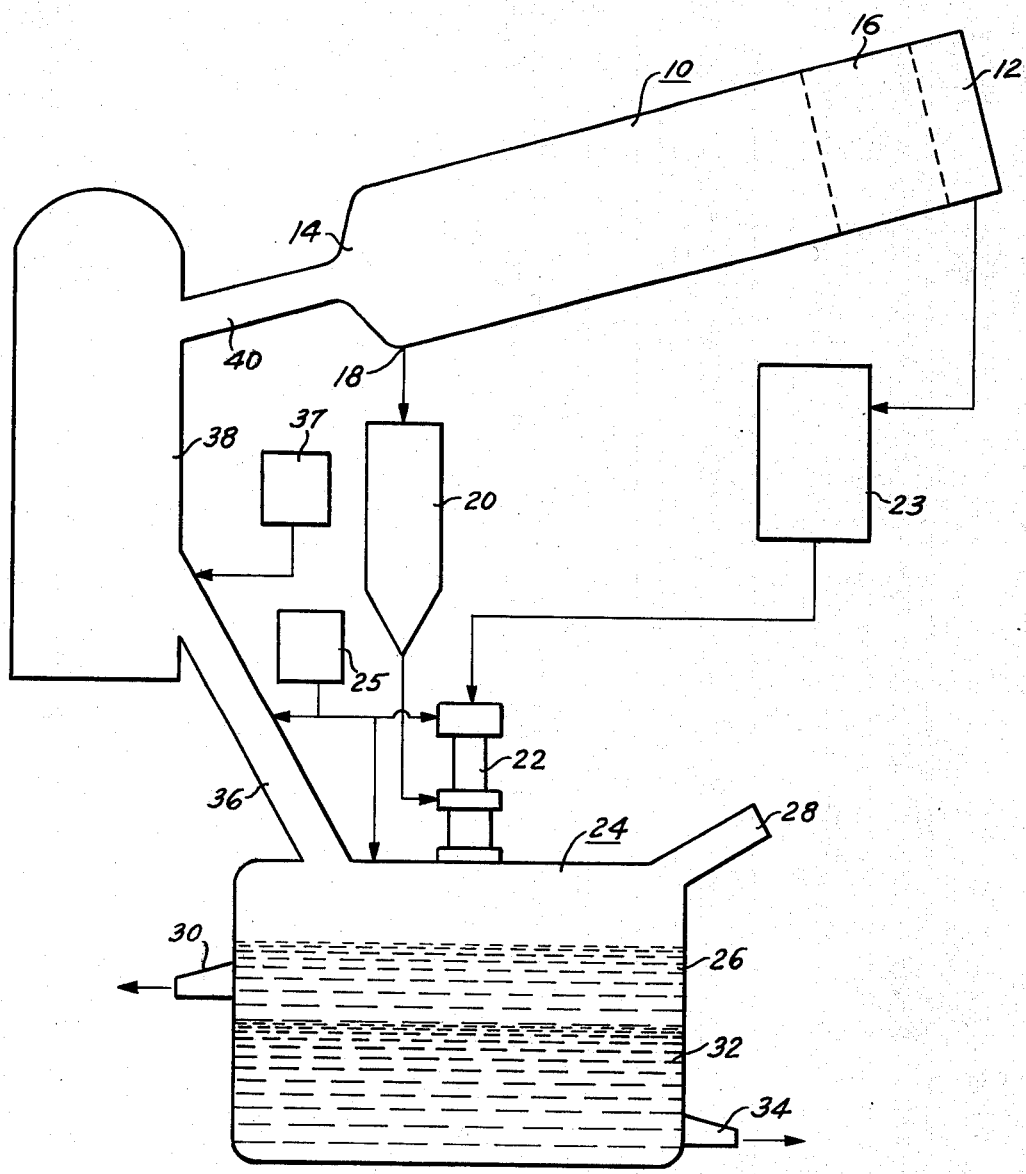

METHOD OF REDUCING IRON OXIDE

BACKGROUND OF THE INVENTION

This invention relates to a method for reducing metal oxides, and more particularly to a method of reducing iron oxides in which the oxides are reduced in several steps.

It is broadly old to produce molten steel by passing iron ore through a plasma arc torch and collecting the torch effluent in a refractory-lined crucible containing a slag. However, the high temperature heat in the plasma stack gases was wasted. In addition, it was found that the reduction of the ore in the torch was relatively incomplete; hence, the slag was rich in iron oxides, resulting in severe corrosion of the crucible refractory as well as a potential loss of iron.

It is an object of this invention to provide a method in which the heat in the off-gas from the plasma arc torch is utilized and in which the temperature of the gas is reduced to a level where it can be handled with conventional materials.

It is a further object of this invention to provide a method of reducing iron oxides in which the reduction of the oxides is substantially completed in a plasma arc torch.

SUMMARY OF THE INVENTION

I have discovered that the foregoing objects can be obtained by feeding solid iron oxide particles through a first reduction unit heated to a temperature sufficient to permit partial reduction of the oxide to occur. Carbon monoxide and hydrogen are fed through the said first reduction unit to partially reduce the oxide particles passing therethrough.

The partially reduced iron oxide particles are fed from the first reduction unit into a second reduction unit heated to a temperature sufficient to substantially completely reduce the particles by reductants which react with the oxide particles to form carbon monoxide and water. The effluent from this second reduction unit is collected in a receiving vessel wherein any unreduced oxides are reduced by reductants to form additional carbon monoxide and water.

Methane is reacted with at least a portion of the water in the effluent gases from the second reduction unit and the receiving vessel to reform this water into carbon monoxide and hydrogen. At least a portion of this carbon monoxide and hydrogen is fed to the first reduction unit to provide at least a portion of the carbon monoxide and hydrogen passed through this unit.

BRIEF DESCRIPTION OF THE DRAWINGS

The sole FIGURE is a schematic diagram of apparatus which can be used for the process of the invention.

DESCRIPTION OF THE PREFERRED EMBODIMENT

As shown in the FIGURE, a first reduction unit, e.g. a rotary kiln 10, is provided with an entrance 12 into which iron oxide-containing material, e.g. iron ore concentrate, may be fed, and a port 14 into which reducing gases may be fed. Preferably the port 14 is disposed at the end of the kiln opposite to the entrance 12, whereby the flow of reducing gases is countercurrent to the flow of the iron ore. The iron ore is in the form of a particulate concentrate, and is preferably sized within the range of 100 to 400 mesh. The kiln 10 preferably contains an initial roasting and preheating zone 16 wherein the ore particles are partially desulfurized.

The kiln 10 is provided along the length thereof with auxiliary heating sources, not shown, so that the temperature of the ore particles across the kiln can be varied from about 1200° C. (2200° F.) to 550° C. (1000° F.). Preferably, but not necessarily, the temperatures in the kiln are below those at which sintering occurs, and the higher temperatures are at the entrance 12 to the kiln 10, adjacent the roasting and pre-heating zone 16, while the lower temperatures are at an exit port 18 provided at the end of the kiln opposite to the entrance 12.

As a result of the countercurrent flow between the reducing gases and the iron ore particles, the most highly reduced particles encounter the richest reducing gas, while the least reduced particles encounter the leanest reducing gas. Thus, the pre-reduction step is highly efficient in terms of degree of metallization. In addition, the tendency for sintering of the particles is decreased by providing the lowest temperature at the exit port 18 of the kiln 10, where the tendency is highest because of the extent of metallization of the particles.

To further decrease the likelihood of sintering of the ore particles, very fine, e.g. less than 400 mesh, particles of ore are not used. In addition, anti-sticking agents such as carbon and lime may be added to the ore in the kiln 10.

Despite the foregoing restrictions on particle size and temperature, under certain combinations of temperature and reducing gas composition, the ore particles may agglomerate in the kiln 10 and form particles excessively large for subsequent passage through the plasma arc torch subsequently to be described. If such agglomeration occurs, the ore particles may in some cases be easily broken to their original size by such simple expedients as passing the agglomerate through a holding container in which an impeller throws the particles against the walls of the container. In other cases, the agglomerate may be too hard to be pulverized by such an expedient, and an intermediate cold crushing operation is then essential.

The reducing agents passing through the rotary kiln 10 are primarily carbon monoxide and hydrogen, although small amounts of methane and carbon are also present. The major reactions taking place in the kiln are as follows:

$$CO/H_2 + Fe_2O_3 \rightarrow CO_2/H_2O + 2Fe_3O_4 \qquad (1)$$

$$H_2/CO + Fe_3O_4 \rightarrow H_2O/CO_2 + 3FeO \qquad (2)$$

$$FeO + CO/H_2 \rightarrow CO_2/H_2O + Fe \qquad (3)$$

$$3FeO + 5CO \rightarrow 4CO_2 + Fe_3C \qquad (4)$$

Up to about 85% of the total reduction may take place in the rotary kiln 10.

The output from the rotary kiln 10 is collected in a hopper 20, wherein it is mixed with limestone and carbon, and this mixture is fed to a second reduction unit, heated to a temperature above about 1400° C. (2500° F.), where the reduction of the iron oxides in the partially reduced ore is substantially completed. The feed comprises metallic iron, FeO, Fe₃C and impurities such as silicon, calcium, sulfur and phosphorus. Hydrogen, solid carbon, and/or hydrocarbons such as methane are also supplied to the second reduction unit to provide reductants for basically the same reactions which take place in the rotary kiln 10. Additionally, the carbon reacts with FeO to produce metallic iron and carbon monoxide. Preferably, the second reduction unit is a plasma arc torch 22, the temperature therewithin being at least about 2775° C. (5000° F.).

The hydrogen supplied to the plasma arc torch 22 is preferably produced in a water gas shift reactor system 23, wherein the exit gases from the rotary kiln 10 are reacted to synthesize hyrogen. Methane may be supplied to the torch 22 from a source 25.

The effluent from the plasma arc torch 22 is collected in a crucible 24 containing a slag 26. Solid carbon may also be added through an inlet 28 directly to the slag 26 to react with any iron oxide therein, while methane from the source 25 is added to the reduction product gases in the crucible 24. The slag 26 is periodically tapped off through a slag hole 30 in the crucible 24, while the raw steel 32 is periodically tapped off through a port 34. The added methane reforms water vapor in the crucible 24 into hydrogen and carbon monoxide, and results in a substantial reduction of the temperature of the gaseous effluent from the torch.

The off-gas from the plasma arc torch 22 and the crucible 24 leaves the crucible through a stack 36, and primarily comprises unreacted hydrogen, although there may also be various amounts of water vapor, carbon monoxide, methane, and sulfur gases present.

The off-gas is fed, along with a substantial quantity of methane, from the source 25, for example, into a natural gas reformer 38. Preferably, the methane is introduced directly into the stack 36 along with additional amounts of water from a source 37. The added water is used to control the quantity of heat removed from the off-gas, as the reaction between the water and the methane is highly endothermic. The reformer has two basic functions. First, reducing gases are generated which are fed directly to the rotary kiln 10. Second, heat is removed from the off-gas as a result of the endothermic reactions in the reformer, so that the temperature of the reducing gases fed to the kiln is about 550° C. (1000° F.) to 1100° C. (2000° F.).

While the reformer 38 may contain no packing, it is preferably packed with solids, e.g. carbon particles, which are heated to incandescence by the hot gases leaving the crucible 24. The heated surfaces provide sites for the reactions occurring in the reformer. The primary reactions are as follows:

$$CH_4 + H_2O = 3H_2 + CO \qquad (1)$$

$$H_2O + C = H_2 + CO \qquad (2)$$

$$CH_4 = C + 2H_2 \qquad (3)$$

The gases passing through the reformer 38 are fed through a conduit 40 into a port 14 provided in the exit end of the rotary kiln 10. Said gases comprise primarily carbon monoxide and hydrogen, although other gases such as methane and sulfur dioxide may also be present. Depending on the extent of iron sulfate formation in the rotary kiln 10, there may occur a recycling and build-up of sulfur in the particles fed to the plasma arc torch 22. If such a build-up occurs, some or all of the output from the reformer 38 can be by-passed through a lime tower to reduce the sulfur content of the gas prior to its entry into the rotary kiln 10.

As a specific example of the invention, based on a one hour operation, 773 kilograms of an iron ore concentrate may be prepared with the following composition:

|  | Wt. % |
|---|---|
| $Fe_2O_3$ | 92.53 |
| FeO | 0.23 |
| $SiO_2$ | 4.9 |
| $Al_2O_3$ | 0.63 |
| $TiO_2$ | 0.21 |
| CaO | 0.83 |
| MgO | 0.67 |

This concentrate may be passed through the rotary kiln 10 in a first direction while a reducing gas comprising 73.5% hydrogen, 18.8% carbon monoxide, 0.7% carbon dioxide, 3.5% water, and 3.5% methane, may be passed through the rotary kiln 10 in the opposite direction. The iron ore leaving the rotary kiln may be reduced by about 70% therein, and has the following composition:

|  | Wt. % |
|---|---|
| Fe | 46.3 |
| FeO | 45 |
| $SiO_2$ | 5.9 |
| $Al_2O_3$ | 0.75 |
| $TiO_2$ | 0.25 |
| CaO | 1.0 |
| MgO | 0.8 |

The partially reduced concentrate, which weighs about 643 kilograms, may then be mixed with about 2.5 kilograms of carbon and 20.6 kilograms of limestone, and this mixture is fed to an 850 kilowatt plasma arc torch 22. Also supplied to the torch is a mixture of 249 cubic meters of hydrogen and 27.7 cubic meters of methane, resulting in a hydrogen to methane ratio of nine to one. The hydrogen is produced in the water gas shift reaction system 23. The exit gases from the rotary kiln 10, which are supplied to the water gas shift reaction system, comprises about 44.5% hydrogen, 10.45% carbon monoxide, 9.03% carbon dioxide, and 32.5% water vapor.

The gaseous effluent from the plasma arc torch 22 is at a temperature of about 3030° C. when it enters the crucible 24 and comprises 71.4% hydrogen, 9.5% carbon monoxide, 1.2% carbon dioxide, and 17.9% water vapor. This effluent is mixed with 61 cubic meters of methane added to the reduction product gases in the crucible 24, which converts about 100% of the water in the effluent to CO and $H_2$, thereby changing the composition of the torch effluent to about 81.4% hydrogen, 17.8% carbon monoxide, and 0.8% carbon dioxide, and lowers the temperature of the torch effluent to about 1650° C.

The iron in the crucible 24 is at a temperature of about 1600° C., and when tapped would weigh about 518 kilograms and have the following composition:

|  | Wt. % |
|---|---|
| Carbon | 0.01 |
| Sulfur | 0.01 |
| Phosphorous | 0.005 |
| Silicon | 0.01 |
| Copper | 0.01 |

-continued

| | Wt. % |
|---|---|
| Iron | balance |

The slag, when tapped, would weigh about 73.6 kilograms and have the following composition:

| | Wt. % |
|---|---|
| $SiO_2$ | 55.3 |
| $Al_2O_3$ | 7.1 |
| $TiO_2$ | 2.4 |
| CaO | 25.0 |
| MgO | 7.6 |
| FeO | 2.6 |

The exit gas from the crucible 24, which has been initially reformed therein, is then fed into the natural gas reformer 38 wherein the reforming is completed. Also supplied to the reformer are 42.7 cubic meters of methane and 42.7 cubic meters of water vapor, resulting in a methane to water ratio of 1.0 and a hydrogen to water ratio of 10. The reforming conversion is about 50%, and the temperature of the gas at the exit of the reformer is about 1030° C. This is the source of the gas supplied to the rotary kiln 10.

All gas percentages herein are by volume, while all other percentages are by weight.

I claim:
1. A method of reducing iron oxides, comprising:
    a. feeding iron oxides, carbon monoxide, and hydrogen through a first reduction unit heated to a temperature sufficient to permit partial reduction of said iron oxides to occur;
    b. feeding the partially reduced iron oxides from said first reduction unit into a plasma arc reduction unit to substantially reduce said oxides and produce a gaseous effluent comprising carbon monoxide and water;
    c. collecting the substantially reduced iron oxides in a receiving vessel wherein any unreduced oxides are reduced and a gaseous effluent comprising carbon monoxide and water is formed;
    d. passing methane and at least a portion of the gaseous effluents formed in said plasma arc reduction unit and said receiving vessel into a natural gas reformer, disposed between said receiving vessel and said first reduction unit, to react the water in said effluents with said methane to produce carbon monoxide and hydrogen and to substantially reduce the temperature of said effluents; and
    e. feeding at least a portion of the carbon monoxide and hydrogen produced in said natural gas reformer to said first reduction unit.

2. A method as recited in claim 1, in which said carbon monoxide and hydrogen are fed through said first reduction unit in a direction opposite to the direction of feed of said iron oxides.

3. A method as recited in claim 2, in which said oxides are heated to a temperature within the range of about 550° to 1200° C. in said first reduction unit, and said partially reduced iron oxides are heated to a temperature above about 1400° C in said plasma arc reduction unit.

4. A method as recited in claim 3, in which said iron oxides are roasted to remove sulfur therefrom in said first reduction unit.

5. A method as recited in claim 3, in which said first reduction unit is a rotary kiln, and said iron oxides are heated in said kiln to a temperature approaching the upper limit of said range at the entrance to said kiln and are at a temperature close to the lower limit of said range at the exit of said kiln.

6. A method as recited in claim 1, in which water is added in said reformer to the effluent gases from said plasma arc reduction unit.

* * * * *